March 26, 1957 — C. O. LASSY — 2,786,372
DRILLING AND TAPPING VISE
Filed Dec. 1, 1953
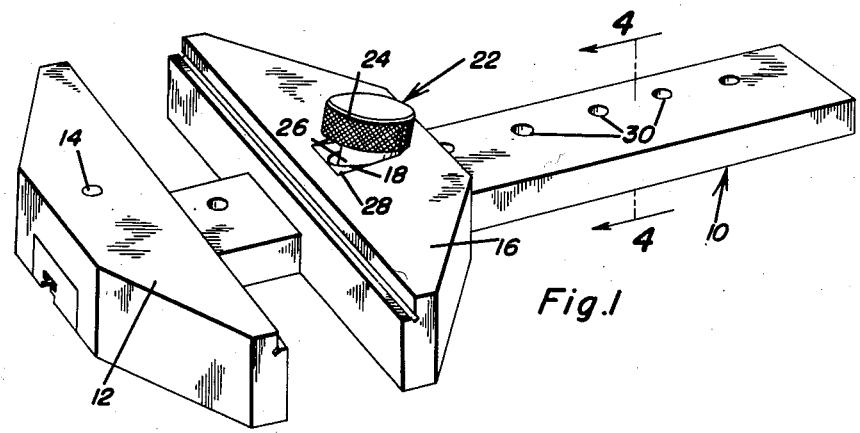
Fig.1
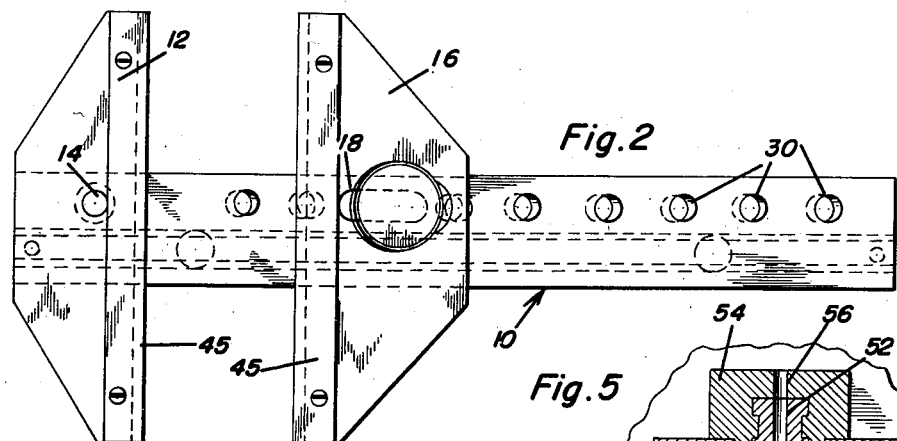
Fig.2
Fig.5
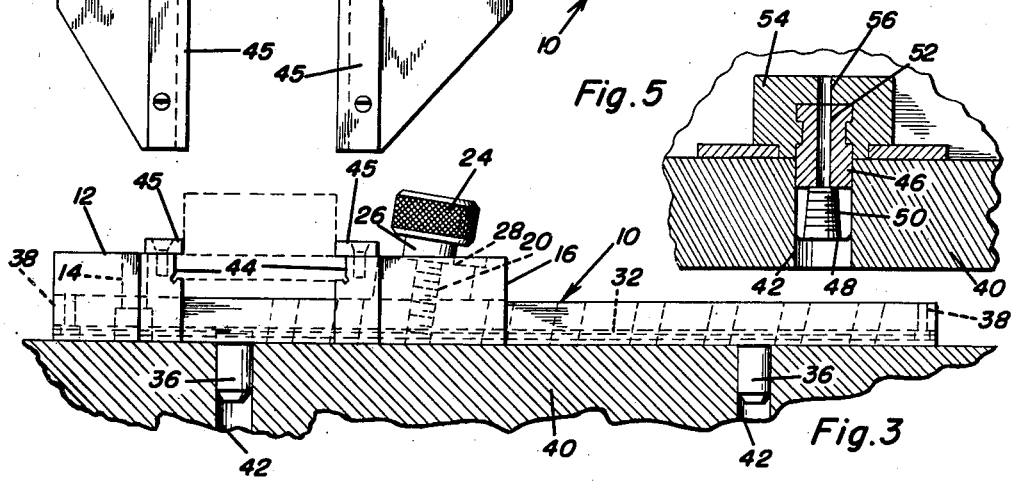
Fig.3
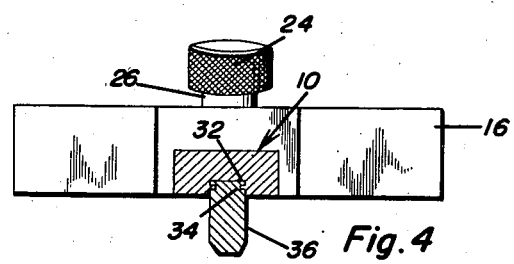
Fig.4
Carl O. Lassy
INVENTOR.

2,786,372

DRILLING AND TAPPING VISE

Carl O. Lassy, Plainville, Conn.

Application December 1, 1953, Serial No. 395,385

1 Claim. (Cl. 77—63)

This invention relates generally to work holding devices and pertains more particularly to a drilling and tapping vise.

A primary object of this invention is to provide an improved form of drilling and tapping vise which is easily attached to a machine table, the entire device being free to slide on the table while at the same time being kept from turning thereon.

Another object of this invention is to provide an improved work holding device wherein the jaws are so formed as to slidably receive a drill jig or tapping fixture such that the work under consideration may be moved in two directions at right angles to each other, either separately or simultaneously on the machine table.

Still another object of this invention is to provide an improved work holder in conformity with the foregoing objects wherein the holding pins are so formed as to be expandable into frictional engagement with the machine table and thus prevent the holder from being bodily lifted from the same.

These together with other objects and advantages which will become subsequently apparent reside in the details of construction and operation, as more fully hereinafter described and claimed, reference being had to the accompanying drawings forming a part hereof, wherein like numerals refer to like parts throughout, and in which:

Figure 1 is a perspective view of the improved work holder;

Figure 2 is a plan view of the assembly shown in Figure 1;

Figure 3 is a side elevational view of the work holder showing the machine table upon which it is mounted in section;

Figure 4 is a transverse vertical section taken substantially along the plane of section line 4—4 in Figure 1; and Figure 5 is an enlarged section similar to Figure 4, but showing a modified form of holding pin.

Referring now more particularly to the drawings, reference numeral 10 indicates the slide bar of the assembly generally which is provided with a flat undersurface for engaging a machine table and which is preferably formed of generally rectangular configuration as shown. At one end of this slide bar is provided a fixed jaw member 12, the same being secured to the slide bar by any suitable means, such as the fastening element 14. Slidably received on the bar is a movable jaw member 16 which is provided centrally thereof with an elongated slot 18 which receives the threaded shank 20 of a clamping member indicated generally by the reference character 22. The clamping member is provided with an enlarged head 24 which may be knurled, if desired, and a portion 26 of reduced diameter disposed between the shank and the head is adapted to seat upon the beveled face 28 on the upper surface of the movable jaw. The slide bar is provided with a series of longitudinally spaced threaded apertures 30 into which the threaded shank 20 is selectively engaged, and it will be noted that these apertures are inclined at such an angle as to be perpendicular to the inclined face 28 on the movable jaw.

On the undersurface of the slide bar, a longitudinally extending groove 32 is provided whose opposed side walls are provided with inwardly projecting flanges 34. Pin members 36 are provided at their upper or head portions with an annular groove receiving the flanges 34 for sliding engagement with the bar but preventing the removal of the pins from the bar except through the ends of the grooves. To prevent displacement of the pin members from the grooves, the opposite ends of the bar are provided with the abutment screws 38 having their heads projecting into the groove and forming abutment members for the heads of the pin members such as to prevent their removal.

In applying the improved drilling and tapping vise to a machine table, the table, indicated by the reference character 40, is provided with a pair of spaced holes 42 snugly receiving the pin members 36. Thus, work held between the jaws 12 and 16 may be fed in and out beneath the drilling or tapping spindle for proper location of the hole to be drilled or the tapping operation to be performed.

It will be manifest that the work may be held in a drill jig or tapping fixture and that these members may be provided with tongues to be received in grooves 44 formed by placing keeper plates 45 on the notched upper edges of the fixed and movable jaw members in the manner shown most clearly in Figure 3. In this manner, the drill jig or tapping fixture may be slid between the jaws transversely of the slide bar such that two perpendicular paths of movement are afforded the work to be operated upon.

Referring now more particularly to Figure 5, wherein a modified form of pin member is shown, it will be seen that this modification takes the form of a cylindrical member 46 having its lower ends split so as to be expansible.

The lower ends of the pins are provided with threaded longitudinal bores 48 receiving a tapered screw member 50 which is recessed at its upper end for the reception of an Allen wrench. For permitting access to this recess, the remainder of the pins are provided with a longitudinal bore 52 and the slide bar 54 is provided at one point therealong with a registering aperture 56 such that when the various apertures 52 and 56 are properly aligned, the Allen wrench may be inserted into engagement with the screw 50 to tighten the same within the bore 48 and expand the split lower end of the pin against the walls of the apertures 42 in the machine table 40. By utilizing this type of pin, the vise assembly cannot be picked up as the tool is retracted after performing its operation on the work, obviating binding between the work and the tool or between the tool and the guide bushing in the drill jig or tapping fixture, and thus materially lengthening the life of both the tool and the drill jig or tapping fixture and materially enhancing the accuracy of work performed. Also, since the vise is prevented from being lifted off the machine table, no chips or foreign material can become lodged between the vise and the machine table which would tend to cause binding between the tool and the work.

It is to be noted that among the many important aspects of this invention, those relating to its durability and light weight construction go hand-in-hand inasmuch as the slide, being of relatively small dimensions in comparison to devices of this general nature, inherently provides for light weight. Also, the specific configuration of the slide permits the same to be hardened and ground by relatively simple machining operations which not only maintains the ultimate cost to the consumer at a low level but also provides for longer tool life due to the increased resistance to wear, nicks or burrs. This applies to both the fixed and movable jaw members also.

Of course, the slide may be manufactured in any desired lengths to suit the capacity requirements of any particular installation of vise.

Also, the vise, being of light weight construction, slides readily on a machine table permitting sensitive movement such that the work may be readily and accurately aligned with the cutting tool. In addition to the advantage of light weight, the open construction of the vise permits chips to fall away from the work readily and easily, preventing chips from building up around the work and thus slowing production and creating a hazard to the worker. It is also to be noted that the abutment screws 38 prevent the vise from accidentally falling from the table.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

A work holding device comprising an elongated bar, a fixed jaw on one end of said bar, a jaw longitudinally movably mounted on said bar, said jaws and bar having an enlarged planar undersurface for engagement with a machine table and providing lateral stability for the jaws, depending pins of substantially constant cross section movably mounted on said bar adapted for vertical reception in selective apertures in a machine table to permit removal of the device from the machine table, said movable jaw having a groove in the lower face thereof, said groove being generally equal in dimension to the bar for receiving said bar to permit longitudinal movement thereof and for permitting vertical removal of the movable jaw from the bar at any point along its length, said movable jaw having a slot therein and an inclined upper surface area encircling the upper edge of the slot, said inclined surface area being inclined downwardly and longitudinally away from the stationary jaw, said bar having a plurality of longitudinally spaced and vertically inclined threaded apertures disposed in underlying relation to the slot and in perpendicular relation to the inclined surface area on the movable jaw, a threaded clamping bolt extending through said slot and screw threadedly engaged with one of said apertures in the bar, said clamping bolt having an enlarged head with a flat lower surface parallel to the inclined surface area for engagement with the inclined surface area for clamping the movable jaw to the bar in adjusted position, the inclined surface area and the lower surface of the bolt head coacting to form a cam lock to prevent movement of the movable jaw away from the stationary jaw for securely holding a workpiece between the jaws.

References Cited in the file of this patent

UNITED STATES PATENTS

| | | |
|---|---|---|
| 1,082,588 | Gross | Dec. 30, 1913 |
| 1,223,412 | Murdoch et al. | Apr. 24, 1917 |
| 2,148,156 | Hagopian | Feb. 21, 1939 |
| 2,479,075 | Martin | Aug. 16, 1949 |